(12) United States Patent
Van Vleet

(10) Patent No.: US 7,677,960 B2
(45) Date of Patent: Mar. 16, 2010

(54) HAND HELD KNIFE

(76) Inventor: Larry Van Vleet, 3615 Central Ave., Lake Station, IN (US) 46405

( * ) Notice: Subject to any disclaimer, the term of this patent is extended or adjusted under 35 U.S.C. 154(b) by 804 days.

(21) Appl. No.: 11/510,904

(22) Filed: Aug. 28, 2006

(65) Prior Publication Data

US 2007/0270091 A1    Nov. 22, 2007

Related U.S. Application Data

(60) Provisional application No. 60/775,276, filed on Feb. 21, 2006.

(51) Int. Cl.
*A22C 21/02* (2006.01)
(52) U.S. Cl. ..................................................... 452/102
(58) Field of Classification Search ......... 452/102–105, 452/2–5, 137; 30/277.4, 272.1, 228, 123, 30/142, 147–149, 340, 535, 296.1, 392–394, 30/369, 383.3, 279.2, 173, 182, 299, 298.4
See application file for complete search history.

(56) References Cited

U.S. PATENT DOCUMENTS

| | | | | |
|---|---|---|---|---|
| 3,417,469 A | * | 12/1968 | Cousins et al. ............. | 30/277.4 |
| 3,664,021 A | * | 5/1972 | Sawyer ....................... | 30/277.4 |
| 3,832,773 A | * | 9/1974 | Langford .................... | 30/277.4 |
| 4,711,030 A | | 12/1987 | Ruston, Sr. | |
| 6,341,425 B1 | | 1/2002 | Kahle | |
| 6,487,779 B1 | | 12/2002 | Underthun | |

\* cited by examiner

*Primary Examiner*—Thomas Price
(74) *Attorney, Agent, or Firm*—James Ray & Assoc

(57) ABSTRACT

An electrically operated knife includes a handle and a first set of dual cutting blades connected together for reciprocal side-to-side linear motion. A first stationary motor connected to a power source and a first reciprocating assembly is removably connected to the first set of dual cutting blades and coupled to an output shaft of the first motor for reciprocally moving the first set of dual cutting blades. There is a second set of dual cutting blades mounted in spaced relationship to the first set of dual cutting blades. A second motor and a second reciprocating assembly are provided for reciprocally moving the second set of dual cutting blades. A mounting member and a pivotable lever are provided for selectively adjusting a spaced relationship between the first set of dual cutting blades and the second set of dual cutting blades and a switch which operates both motors.

17 Claims, 2 Drawing Sheets

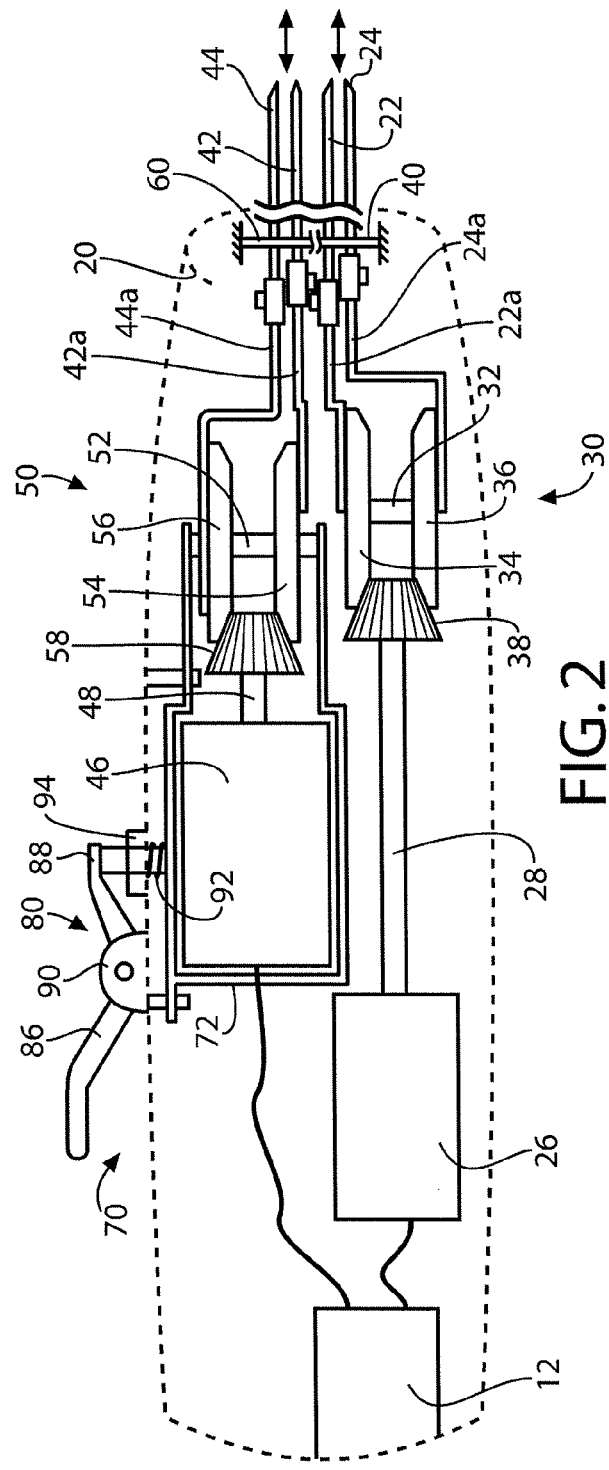
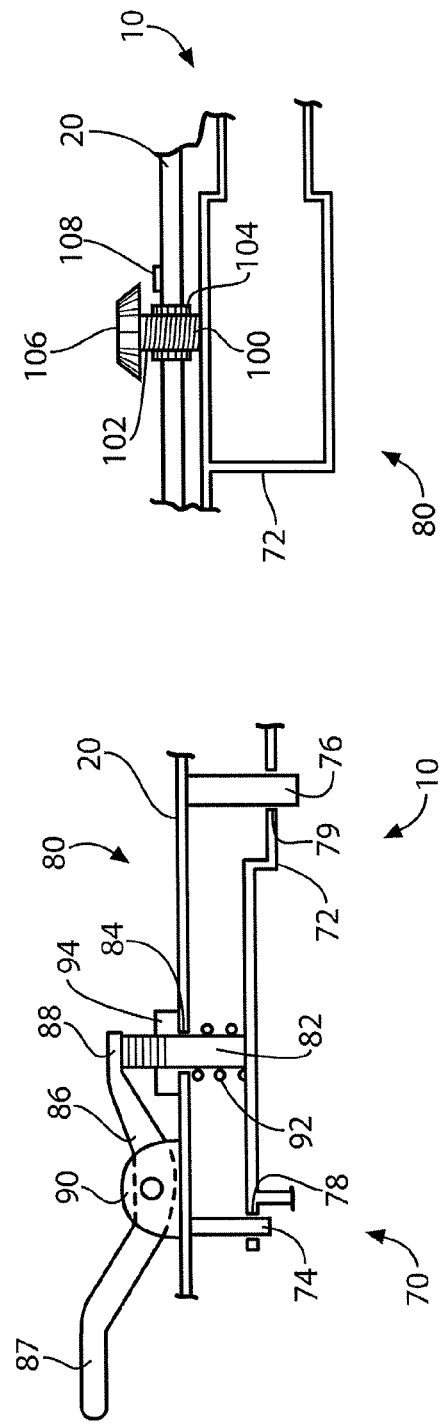
FIG. 2
FIG. 4
FIG. 3

HAND HELD KNIFE

CROSS-REFERENCE TO RELATED APPLICATIONS

This application is related to and claims priority from Provisional Patent Application Ser. No. 60/775,276 filed Feb. 21, 2006.

FIELD OF THE INVENTION

The present invention relates, in general, to electrically operated hand-held knives and, more particularly, this invention relates to an electrically operated fillet knife having two sets of dual cutting blades.

BACKGROUND OF THE INVENTION

As is generally well known, in order to remove fillets from both sides of a whole fish, the fish is placed in a horizontal position and the fillet knife is used to enter the end of the fish. The person then guides the knife in close proximity to and along the bone skeleton towards the other end to remove one fillet from the bone skeleton. The fish is then flipped over and the process is repeated to remove the other fillet. Moving the knife further from the skeleton results in wasted meat while contact between the knife and the skeleton generally leaves bone particles in the fillet.

Accordingly, the process requires considerable skill and concentration in order to reduce meat waste, eliminate the presence of bone particles and provide a visually appealing product. The process is particularly frustrating to a novice or to a person who has not yet obtained sufficient experience, while professionals often desire to reduce the time needed to fillet the whole fish.

Electrically operated fillet or carving knives, which use a pair of reciprocating blades, somewhat improve the process of filleting the fish but do not alleviate all the difficulties. Examples of such electric knives are taught in U.S. Pat. No. 6,487,779 to Underthun, U.S. Pat. No. 6,341,425 to Kahle and U.S. Pat. No. 4,711,030 to Ruston, Sr.

As it is further known, the electrically operated knives are employed to carve and slice cooked meets such as baked ham, roast turkey, beef roasts and the like. While reducing the time necessary to carve and slice meats, the quality of the effort and, particularly, the thickness uniformity of the sliced meet is governed by the person performing such carving and slicing. And as a result, the thickness of the sliced meat can vary from slice to slice.

SUMMARY OF THE INVENTION

According to a first embodiment, the invention provides an electrically operated hand-held knife. The knife includes a handle. A first set of dual cutting blades is connected together for a reciprocal side-to-side linear motion. A first electric motor connectable to a power source is mounted in a stationary manner within the handle. A first reciprocating assembly is removably connected to the first set of dual cutting blades and is coupled to an output shaft of the first electric motor for reciprocally moving the first set of dual cutting blades. There is a second set of dual cutting blades connected together for a reciprocal side-to-side linear motion. Such second set of dual cutting blades is mounted in spaced relationship to the first set of dual cutting blades. A second electric motor connectable to the power source is mounted for a lateral movement within the handle. A second reciprocating assembly is removably connected to the second set of dual cutting blades and is coupled to an output shaft of the second electric motor for reciprocally moving the second set of dual cutting blades. A mounting member enables the lateral movement of the second electric motor, the second reciprocating means and the second set of dual cutting blades. A lever is manually operable for laterally moving the second electric motor, the second reciprocating means and the second set of dual cutting blades and for selectively adjusting the spaced relationship between the first set of dual cutting blades and the second set of dual cutting blades. A switch is disposed in the handle for operating the first electric motor and the second electric motor.

According to a second embodiment of the invention, there is provided an electrically operated hand-held knife having a handle, a pair of cutting blades connected together for reciprocal side-to-side linear motion, an electric motor, means connected to the electric motor for reciprocally moving the set of dual cutting blades, a switch disposed in the handle for operating the motor. At least one of the pair of cutting blades has a portion of an outer surface, which is disposed adjacent a free end of the at least one cutting blade and which is one of arcuate and tapered at a predetermined angle towards the free end.

OBJECTS OF THE INVENTION

It is, therefore, one of the primary objects of the present invention to provide an improved electrically operated knife for filleting fish and carving and slicing prepared meats.

Another object of the present invention is to provide an electrically operated knife which reduces the effort and improves quality of filleting fish and carving and slicing prepared meats.

Yet another object of the present invention is to provide an electrically operated knife which provides for thickness uniformity of sliced meats.

A further object of the present invention is to provide an electrically operated knife which employs an adjustable set of cutting blades.

Yet a further object of the present invention is to provide an electrically operated knife which is simple to use.

An additional object of the present invention is to provide an electrically operated knife which employs a straight internal cutting blade.

Another object of the present invention is to provide an electrically operated knife which is capable of removing a pair of fillets in a single motion.

Yet another object of the present invention is to provide an electrically operated knife which employs a pair of spaced dual cutting blade sets movable away from each other by a manually operable lever and biased toward each other for guiding about the bone skeleton during filleting fish.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 2 is a partial plan view of the fillet knife shown in FIG. 1, illustrating a gear and blade assembly coupled to an electrical motor;

FIG. 3 is a partial schematic view of the fillet knife of the present invention illustrating a gap adjustment mechanism according to a presently preferred embodiment of the invention;

FIG. 4 is a partial schematic view of the fillet knife of the present invention illustrating a gap adjustment mechanism according to an alternative embodiment of the invention.

BRIEF DESCRIPTION OF THE VARIOUS EMBODIMENTS OF THE INVENTION

Figure 1:
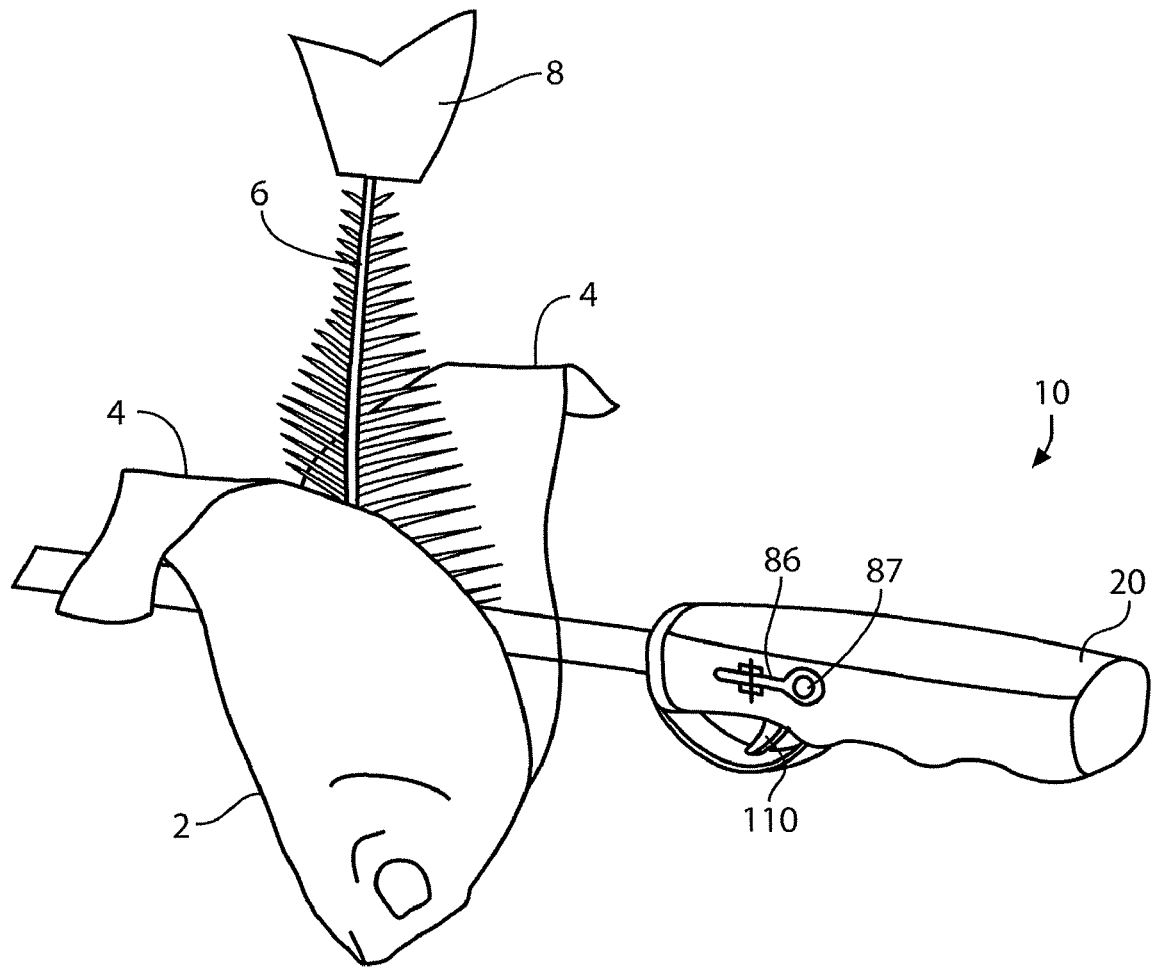
FIG. 1 is a perspective view of a presently preferred embodiment of a fillet knife of the present invention in use for filleting a fish.

Prior to proceeding to the more detailed description of the present invention, it should be noted that, for the sake of clarity and understanding, identical components which have identical functions have been identified with identical reference numerals throughout the several views illustrated in the drawing figures.

Refer now to FIGS. 1-5. Illustrated therein is an electrically operated hand-held knife, generally designated 10, which is shown in use filleting a fish 2. The knife 10 includes a handle 20 and a first set of dual cutting blades 22 and 24 connected together for reciprocal side-to-side linear motion.

There is a first electric motor 26 mounted in a stationary manner within the handle 20 and connected to a power source 12. A removable first reciprocating means, generally designated 30, is connected to the first set of dual cutting blades 22 and 24 and is coupled to an output shaft 28 of first electric motor 26 for reciprocally moving the first set of dual cutting blades 22 and 24.

It is presently preferred that such first reciprocating means 30 is constructed according to the teachings of U.S. Pat. No. 4,711,030 which are incorporated herein by reference thereto. Accordingly, such first reciprocating means 30 includes a support shaft 32, which is mechanically attached to the handle 20. A pair of bevel gears 34 and 36 are mounted for rotation on opposite ends of support shaft 32. A beveled pinion gear 38 engages the first and second bevel gears 34 and 36 and is coupled to output shaft 28 of first electric motor 26.

The first reciprocating means 30 further includes a pair of force transmitting end portions 22a and 24a each disposed within a respective cutting blade 22 and 24 and coupled to one of the pair of beveled gears 34 and 36 for converting a rotary motion of output shaft 28 to a linear counter-reciprocating motion of the respective cutting blade 22 and 24.

A pair of elongated slots 22b and 24b are formed within respective cutting blade 22 and 24 each disposed intermediate force transmitting member 22a and 24a and a cutting end 22c and 24c. The pair of elongated slots 22b and 24b are disposed in overlapping alignment with each other. A fulcrum shaft 40 is disposed within handle 20 and projects through the overlapping elongated slots 22b and 24b.

The electric knife 10 has a second set of dual cutting blades 42 and 44 connected together for reciprocal side-to-side linear motion. Such second set of dual cutting blades 42 and 44 is disposed in spaced relationship to the first set of dual cutting blades 22 and 24. A second electric motor 46 is mounted for lateral movement within the handle 20 and connected to the power source 12. A removable second reciprocating means, generally designated 50, is connected to the second set of dual cutting blades 42 and 44 and coupled to output shaft 48 of second electric motor 46 for reciprocally moving the second set of dual cutting blades 42 and 44.

In the presently preferred embodiment of the invention, such second reciprocating means 50 is constructed according to the teachings of U.S. Pat. No. 4,711,030. Therefore, the second reciprocating means 50 includes a support shaft 52 which is mechanically attached for rotation within handle 20.

A pair of bevel gears 54 and 56 are mounted for rotation on opposite ends of the support shaft 52. A beveled pinion gear 58 engages the first and second bevel gears 54 and 56 and is coupled to the output shaft 48 of the second electric motor 46. The second reciprocating means 50 further includes a pair of force transmitting end portions 42a and 44a each disposed within a respective cutting blade 42 and 44 and coupled to one of the pair of beveled gears 54 and 56 for converting a rotary motion of the output shaft 48 to a linear counter-reciprocating motion of the respective cutting blade 42 and 44.

A pair of elongated slots 42b and 44b are formed within the respective cutting blade 42 and 44 each disposed intermediate the force transmitting member 42a and 44a and a cutting end 42c and 44c. The pair of elongated slots 42b and 44b are disposed in overlapping alignment with each other. A fulcrum shaft 60 is disposed within the handle 20 and projects through the pair of overlapping elongated slots 42b and 44b.

A mounting means, generally designated 70, is provided for enabling lateral movement of the second electric motor 46, the second reciprocating means 50 and the second set of dual cutting blades 42 and 44. In the presently preferred embodiment of the present invention, such mounting means 70 includes a mounting member 72. The second electric motor 46 and the support shaft 52 of the second reciprocating means 50 are attached to the mounting member 72.

A pair of guide pins 74 and 76 are disposed in spaced relationship to an interior surface of handle 20. Each such guide pin 74 and 76 is attached to such interior portion of the handle 20. Accordingly, a pair of guide apertures 78 and 79 are disposed within mounting member 72, each engaging a respective one of the pair of guide pins 74 and 76 for enabling a linear movement of the mounting member 70 about guide pins 74 and 76.

The knife 10 additionally includes a manually operable means, generally designated 80, best shown in FIGS. 2-3, for laterally moving second electric motor 46, second reciprocating means 50 and second set of dual cutting blades 42 and 44 and selectively adjusting the spaced relationship between the first set of dual cutting blades 22 and 24 and the second set of dual cutting blades 42 and 44.

In the presently preferred embodiment of the invention, the manually operable means 80 includes an elongated member 82, which is rigidly attached or is integral to mounting member 72 and extends through an aperture 84 disposed within handle 20. A manually operable lever 86 has a first end 88 thereof connected to a free end of the elongated member 82. Preferably, an opposed end of the lever 86 is adapted with an aperture 87 to form a scissor-like handle loop.

A pivot means 90 is provided for pivotally connecting the lever 86 to an exterior surface of the handle 20 intermediate opposed ends of the lever 86. Furthermore, a bias means 92 is caged between the interior surface of the handle 20 and the mounting member 72 for biasing mounting member 72 away from the interior surface of handle 20 and for laterally moving at least the second set of dual cutting blades towards the first set of dual cutting blades 42 and 44. Preferably, elongated member 82 is a shaft like member and the bias means 92 is a compression spring 92 disposed about the shaft like member 82.

Furthermore, at least a portion of the free end of the elongated member 82 is preferably threaded and the knife 10 further includes a member 94, such as a nut threadedly engaging the threaded portion of the elongated member 82 for providing a gap 25 between the second set of dual cutting blades 42 and 44 and the first set of dual cutting blades 22 and 24.

Reference now to FIG. 4. Illustrated therein is an alternative embodiment of the manually operable means 80 which includes an elongated member 100 attached to the mounting member 72 and threadedly engaging a threaded aperture 104 provided in the handle 20. A free end 102 of the elongated member 100 extends past an exterior surface of the handle 20.

A knob 106 is securely attached to the free end 102 of the elongated member 100. Such knob 106 is manually rotatable in a first direction for laterally moving the second set of dual cutting blades 42 and 44 towards the first set of dual cutting blades 42 and 44 and manually rotatable in an opposite direction for laterally and linearly moving the second set of dual cutting blades 42 and 44 away from the first set of dual cutting blades 22 and 24.

The knife 10 may further include a scale means 108 attached to an exterior surface of the handle 20 and in close proximity to the knob 106 for simply determining the spaced relationship between the second set of dual cutting blades 42 and 44 and the first set of dual cutting blades 22 and 24. A switch 110 is disposed in the handle 20 for operating first electric motor 26 and second electric motor 46.

The power source 12 is preferably a battery means 12 disposed one of within and coupled to the handle 20. Such battery means 12 may be one of a rechargeable and a replaceable battery. U.S. Pat. No. 6,487,779 to Underthun, U.S. Pat. No. 6,341,425 to Kahle disclose various types of rechargeable batteries. The teachings of U.S. Pat. No. 6,487,779 and U.S. Pat. No. 6,341,425 are incorporated herein by reference thereto. In accordance with such teachings, the knife 10 is provided with an adapter (not shown) for enabling operation from a 110 VAC household voltage, 12V battery or any other power source 12.

As best illustrated in FIG. 2, the internally disposed cutting blade 22 and 42 in each of the first set of dual cutting blades 22 and 24 and the second set of dual cutting blades 42 and 44 is substantially straight. Such construction is advantageous in maintaining a close relationship between such internally disposed cutting blades 22 and 42.

Figure 5:
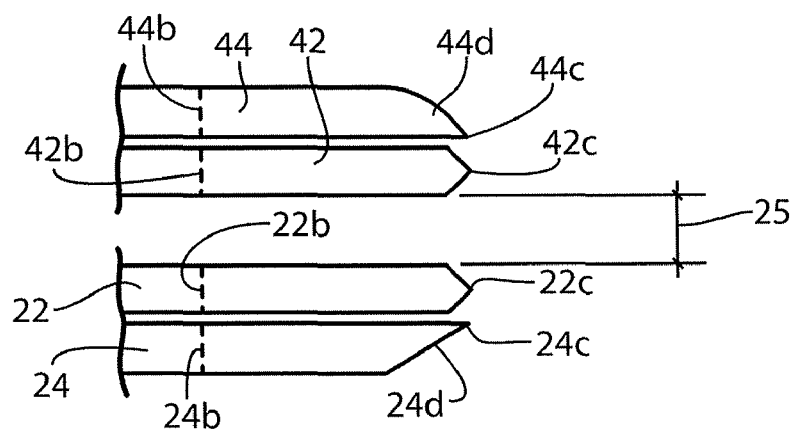
FIG. 5 is a partial schematic view of the fillet knife of the present invention illustrating an arrangement of the dual set of cutting blades.

Now in reference to FIG. 5, at least one externally disposed cutting blade 24 and 44, includes a portion of an outer surface 24*d* and 44*d* disposed adjacent a free end 24*c* and 44*c* of the at least one cutting blade 22 and 44, being one of arcuate and tapered at a predetermined angle towards the free end. For the sake of illustration, the first external blade 24 has a tapered portion 24*d* and the second external blade 44 has an arcuate portion 44*d*.

The use of the knife 10 is best illustrated in FIG. 1 for filleting a fish 2. The fish 2 may be held in a vertical position by the tail 8. The sets of dual cutting blades are positioned adjacent the tail 8 and the gap 25 is adjusted by way of lever 86 to position the internal cutting blades 22, 42 about the bone skeleton 6. The lever 86 is than released and the bias spring 92 will bias both sets of the dual cutting blades towards each other and for guiding about the bone skeleton 6. The knife 10 is than moved downwardly, as illustrated in FIG. 1, towards the head in a single motion to remove a pair of fillets 4.

When a plurality of fish 2 of the same type is to be filleted, the lock nut 94 is utilized to secure the gap 25 which is preselected during the initial cut. It will be appreciated that employment of a dual set of cutting blades will reduce the time necessary to fillet either a single or a plurality of fish 2 and the overall process does not require considerable skill and concentration.

It will be further appreciated that employment of a pair of sets of dual cutting blades will provide for uniform and consistent slice thickness during carving or slicing prepared meats.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An electrically operated hand-held knife, said knife comprising:
   (a) a handle;
   (b) a first set of dual cutting blades connected together for reciprocal side-to-side linear motion;
   (c) a first electric motor mounted within said handle and connected to a power source;
   (d) a first reciprocating means removably connected to said first set of dual cutting blades and coupled to an output shaft of said first electric motor for reciprocally moving said first set of dual cutting blades;
   (e) a second set of dual cutting blades connected together for reciprocal side-to-side linear motion and mounted in spaced relationship to said first set of dual cutting blades;
   (f) a second electric motor mounted for lateral movement within said handle and connected to said power source;
   (g) a second reciprocating means removably connected to said second set of dual cutting blades and coupled to an output shaft of said second electric motor for reciprocally moving said second set of dual cutting blades;
   (h) a mounting means for enabling said lateral movement of said second electric motor, said second reciprocating means and said second set of dual cutting blades;
   (i) a manually operable means for laterally moving said second electric motor, said second reciprocating means and said second set of dual cutting blades and for selectively adjusting said spaced relationship between said first set of dual cutting blades and said second set of dual cutting blades; and
   (j) a switch disposed in said handle for operating said first electric motor and said second electric motor.

2. The knife, according to claim 1, wherein said first reciprocating means includes:
   a. a support shaft mechanically attached to said handle;
   b. a pair of bevel gears mounted for rotation on opposite ends of said support shaft;
   c. a beveled pinion gear engaged with said first and second bevel gears, said beveled pinion gear being coupled to said output shaft of said first electric motor;
   d. a pair of force transmitting members each disposed within a respective cutting blade of said first set of dual cutting blades and coupled to one of said pair of beveled gears for converting a rotary motion of said output shaft to a linear counter-reciprocating motion of said respective cutting blade;
   e. a pair of elongated slots each disposed within said respective cutting blade intermediate said force transmitting member and a cutting end, said pair of elongated slots being disposed in overlapping alignment with each other; and f. a fulcrum shaft disposed within said handle and projecting through said pair of overlapping elongated slots.

3. The knife, according to claim 1, wherein said power source is one of disposed within and coupled to said handle.

4. The knife, according to claim 3, wherein said power source is a battery means.

5. The knife, according to claim 4, wherein said battery means is one of rechargeable and a replaceable battery.

6. The knife, according to claim 1, wherein said second reciprocating means includes:
   (a) a support shaft mechanically attached to said mounting means;
   (b) a pair of bevel gears mounted for rotation on opposite ends of said support shaft;
   (c) a beveled pinion gear engaged with said first and second bevel gears, said beveled pinion gear being coupled to said output shaft of said first electric motor;
   (d) a pair of force transmitting members each disposed within a respective cutting blade of said second set of dual cutting blades and coupled to one of said pair of beveled gears for converting a rotary motion of said output shaft to a linear counter-reciprocating motion of said respective cutting blade;
   (e) a pair of elongated slots each disposed within said respective cutting blade intermediate said force transmitting member and a cutting end, said pair of elongated slots being disposed in overlapping alignment with each other; and
   (f) a fulcrum shaft disposed within said handle and projecting through said pair of overlapping elongated slots.

7. The knife, according to claim 1, wherein said mounting means includes:
   (a) a mounting member having said second electric motor and a predetermined portion of said second reciprocating means attached to said mounting member;
   (b) a pair of guide pins attached in spaced relationship to an interior surface of said handle; and
   (c) a pair of guide apertures disposed within said mounting member, each engaging a respective one of said pair of guide pins for enabling linear movement of said mounting member about said pair of guide pins.

8. The knife, according to claim 7, wherein said manually operable means includes:
   (a) an elongated member rigidly attached to said mounting member and extending through an aperture disposed within said handle;
   (b) a lever having one end connected to a free end of said elongated member;
   (c) a pivot means for pivotally connecting said lever to an outer surface of said handle intermediate opposed ends of said lever; and
   (d) a bias means caged between said handle and said mounting member for biasing said mounting member away from said interior surface of said handle and for laterally moving said second set of dual cutting blades towards said first set of dual cutting blades.

9. The knife, according to claim 8, wherein said elongated member is a shaft like member and said bias means is a compression spring disposed about said shaft like member.

10. The knife, according to claim 8, wherein at least a portion of said free end of said elongated member is threaded and said knife further includes a member threadably engaging said threaded portion of said elongated member for securing a preselected spaced relationship between said second set of dual cutting blades and said first set of dual cutting blades.

11. The knife, according to claim 7, wherein said manually operable means includes:
   (a) an elongated threaded member attached to said mounting member and threadably engaging a threaded aperture disposed within said handle, said elongated member having a free end thereof extending past an external surface of said handle; and
   (b) a knob attached to said free end of said elongated member and manually rotatable in a first direction for laterally moving said second set of dual cutting blades towards said first set of dual cutting blades and manually rotatable in an opposite direction for laterally moving said second set of dual cutting blades away from said first set of dual cutting blades.

12. The knife, according to claim 11, wherein said knife further includes a scale means attached to an exterior surface of said handle in close proximity to said knob for determining said spaced relationship between said second set of dual cutting blades and said first set of dual cutting blades.

13. The knife, according to claim 1, wherein an internally disposed cutting blade in each of said first set of dual cutting blades and said second set of dual cutting blades is substantially straight.

14. The knife, according to claim 1, wherein an externally disposed cutting blade in each of said first set of dual cutting blades and said second set of dual cutting blades has an offset force transmitting end coupled to a respective one of said first reciprocating means and said second reciprocating means.

15. The knife, according to claim 1, wherein at least one externally disposed cutting blade includes a portion of an outer surface disposed adjacent a free end of said at least one cutting blade, said portion being one of arcuate and tapered at a predetermined angle towards said free end.

16. In an electrically operated hand-held knife having a handle, a pair of cutting blades connected together for reciprocal side-to-side linear motion, an electric motor, means connected to said electric motor for reciprocally moving said set of dual cutting blades, a switch disposed in said handle for operating said motor, the improvement comprising at least one of said pair of cutting blades having a portion of an outer surface disposed adjacent a free end of said at least one cutting blade, said portion being one of arcuate and tapered at a predetermined angle towards said free end.

17. An electrically operated hand-held knife, said knife comprising:
   (a) a handle;
   (b) a first set of dual cutting blades connected together for reciprocal side-to-side linear motion, wherein an externally disposed cutting blade includes a portion of an outer surface disposed adjacent a free end of said at least one cutting blade, said portion being one of arcuate and tapered at a predetermined angle towards said free end;
   (c) a first electric motor mounted within said handle and connected to a power source;
   (d) a first reciprocating means removably connected to said first set of dual cutting blades and coupled to an output shaft of said first electric motor for reciprocally moving said first set of dual cutting blades;
   (e) a second set of dual cutting blades connected together for reciprocal side-to-side linear motion and mounted in a spaced relationship to said first set of dual cutting blades, wherein an externally disposed cutting blade within said second set of dual cutting blades includes a portion of an outer surface disposed adjacent a free end of said at least one cutting blade, said portion being one of arcuate and tapered at a predetermined angle towards said free end;
   (f) a second electric motor mounted for lateral movement within said handle and connected to said power source;

(g) a second reciprocating means removably connected to said second set of dual cutting blades and coupled to an output shaft of said second electric motor for reciprocally moving said second set of dual cutting blades; and (h) a switch disposed in said handle for operating said first electric motor and said second electric motor.

* * * * *